US005169248A

United States Patent [19]

Claudio et al.

[11] Patent Number: 5,169,248

[45] Date of Patent: Dec. 8, 1992

[54] FEED ARRANGEMENT FOR A TYPING AND/OR CORRECTION RIBBON FOR TYPEWRITERS, AND LINEAR MOTOR USE THEREIN

[75] Inventors: Gillio Claudio, Brosso Canavese; Bonmassari Gianpaolo, Ivrea, both of Italy

[73] Assignee: Ing. C. Olivetti & C., S.p.A., Ivrea, Italy

[21] Appl. No.: 606,953

[22] Filed: Oct. 31, 1990

[30] Foreign Application Priority Data

Dec. 21, 1989 [IT] Italy .............................. 68143 A/89

[51] Int. Cl.[5] ...................... B41J 33/32; H02K 41/02

[52] U.S. Cl. .................................. 400/225; 400/223; 310/12

[58] Field of Search ............... 400/223, 225, 235, 236, 400/236.1, 236.2; 74/88, 126, 128, 575, 577 M, 578; 318/14, 135, 687; 310/12-15, 17, 20, 23, 27, 78, 80

[56] References Cited

U.S. PATENT DOCUMENTS

| | | | |
|---|---|---|---|
| 658,997 | 10/1900 | Perret | 310/21 |
| 3,020,425 | 2/1962 | Steiner | 310/20 |
| 4,037,708 | 7/1977 | Walker-Arnott | 400/225 |
| 4,443,124 | 4/1984 | Ozawa | 400/225 |
| 4,498,792 | 2/1985 | Falconieri | 400/225 |
| 4,527,108 | 7/1985 | Enda | 318/687 |
| 4,626,718 | 2/1986 | Moriyama | 400/225 |
| 5,055,725 | 10/1991 | LaSota | 310/12 |

FOREIGN PATENT DOCUMENTS

| | | | |
|---|---|---|---|
| 454736 | 5/1913 | France | 310/20 |
| 75888 | 6/1981 | Japan | 400/225 |
| 49990 | 3/1984 | Japan | 400/236.1 |

*Primary Examiner*—Clifford D. Crowder
*Assistant Examiner*—Joseph R. Keating
*Attorney, Agent, or Firm*—Banner, Birch, McKie & Beckett

[57] ABSTRACT

A feed arrangement for a typing ribbon and/or a correction ribbon comprises a linear motor having a coil-carrying slide which is movable with an alternating rectilinear movement, a toothed wheel for the feed movement of the ribbon, and a connecting mechanism interposed between the coil-carrying slide and the wheel for converting the movement of the slide into a unidirectional rotary movement of the wheel for advancing the ribbon. The connecting mechanism comprises a first lever which is moved by the slide and two mutually independent ratchet assemblies and which are capable of alternately engaging with two diametrally oppositely disposed teeth on the toothed wheel. The ribbon is carried by a cassette and the wheel rotates a blade capable of engaging into a seat in a feed roller of the cassette.

The linear motor is of the type comprising a permanent magnet of cylindrical shape, a ferromagnetic core which is coaxial with respect to the magnet and which surrounds the permanent magnet and defines a radial air gap with the permanent magnet, and a winding which is accommodated in the air gap and is supported by the coil-carrying slide. The slide is capable of bidirectional movement coaxially with respect to the permanent magnet in response to bidirectional excitation currents in the winding, coming from an actuation circuit which in turn is controlled by a central unit of the machine.

12 Claims, 5 Drawing Sheets

FEED ARRANGEMENT FOR A TYPING AND/OR CORRECTION RIBBON FOR TYPEWRITERS, AND LINEAR MOTOR USE THEREIN

BACKGROUND OF THE INVENTION

The present invention concerns a feed arrangement for a typing ribbon and/or a correction ribbon for typing machines comprising an electromagnetic arrangement having an excitation winding and an output member capable of alternating movement, a drive element for the feed movement of the ribbon, and a connecting mechanism interposed between the output member and the drive element for converting the alternating movement of the output member into a unidirectional movement of the drive element for producing a unidirectional feed movement of the ribbon.

U.S. Pat. No. 4,462,702 assigned to Ing. C. Olivetti & C., S.p.A. discloses a feed arrangement of that type having an electromagnet of rotary type, in which the output member comprises a rotor which is capable of performing a limited rotary movement. The rotor produces the energy for the feed movement of the ribbon, in response to a unidirectional current pulse on the excitation winding of a magnetic stator circuit, and it is returned to the rest condition by a corresponding return spring. As a connecting mechanism, that arrangement has a device with a double tooth configuration and with two toothed wheels, which is interposed between the rotor and a drive element for producing the feed movement of the ribbon, to convert the alternating movement of the rotor into a unidirectional movement of the drive element to feed the ribbon. That feed arrangement is reliable and functional for mounting on a typewriter of standard type, but it is excessively expensive and bulky for fitting to portable typewriters in the medium-low range in which both cost and size are to be kept down as far as possible.

SUMMARY OF THE INVENTION

The invention is defined in the appended claims to which reference should be made.

In a preferred embodiment of the invention described in more detail below the electromagnetic device comprises a linear motor having a permanent magnet which generates a given magnetic flux through the excitation winding. The excitation winding and the permanent magnet are capable of relative movement to cause bidirectional actuation of the output member in response to a bidirectional excitation current in the excitation winding. The connecting mechanism comprises means for converting the bidirectional actuation of the output member into two unidirectional actuations of the drive element for the feed movement of the ribbon.

The preferred ribbon feed arrangement embodying the invention is simple, reliable and above all of moderate cost and size.

BRIEF DESCRIPTION OF THE DRAWINGS

A preferred embodiment of the invention is set forth in the following description which is given by way of non-limiting example and with reference to the accompanying drawings, in which.

DETAILED DESCRIPTION OF THE PREFERRED EMBODIMENTS

Figure 1:
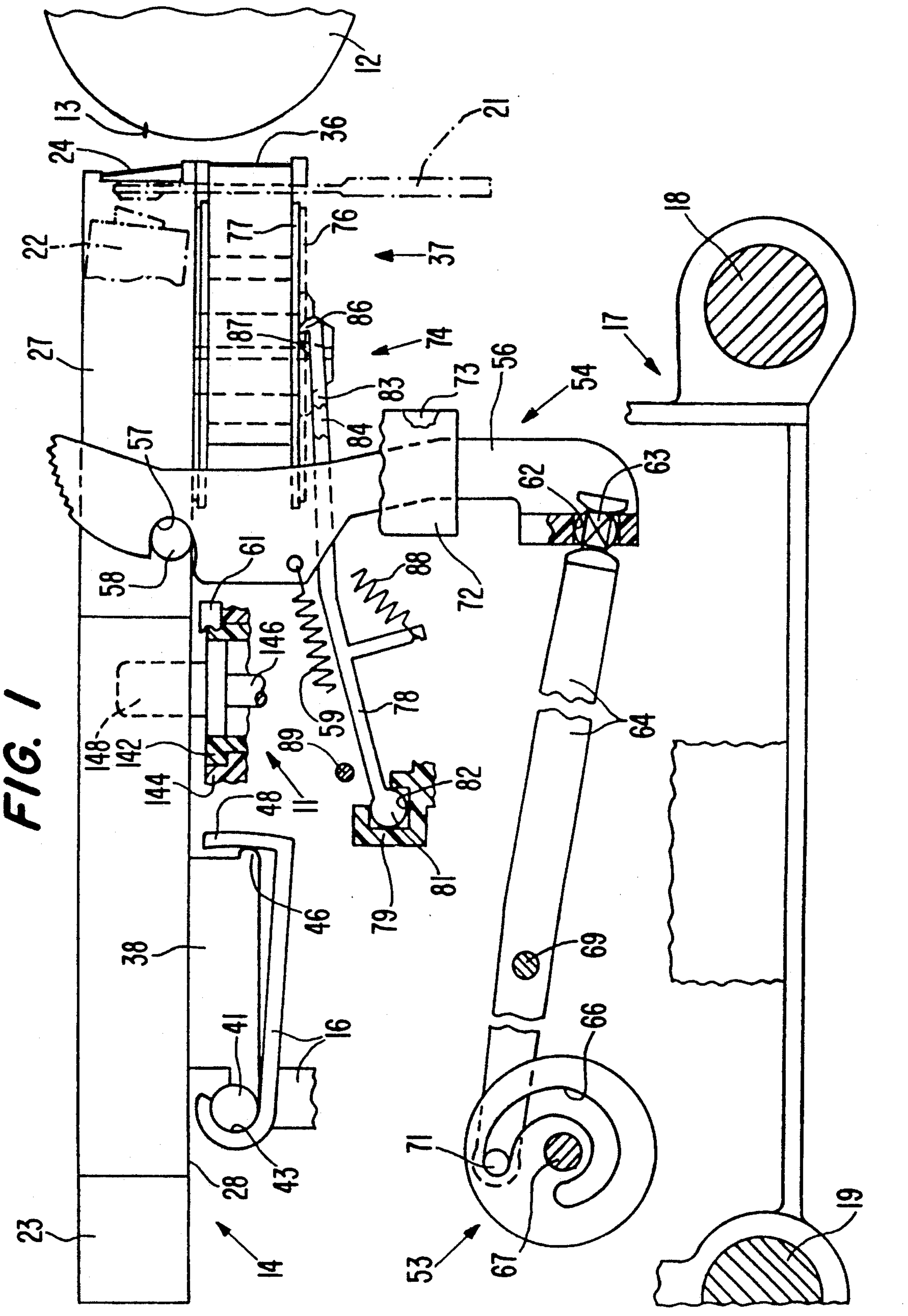
FIG. 1 is a partial longitudinal view of a typewriter to which a feed arrangement embodying the invention is fitted.
Figure 2:
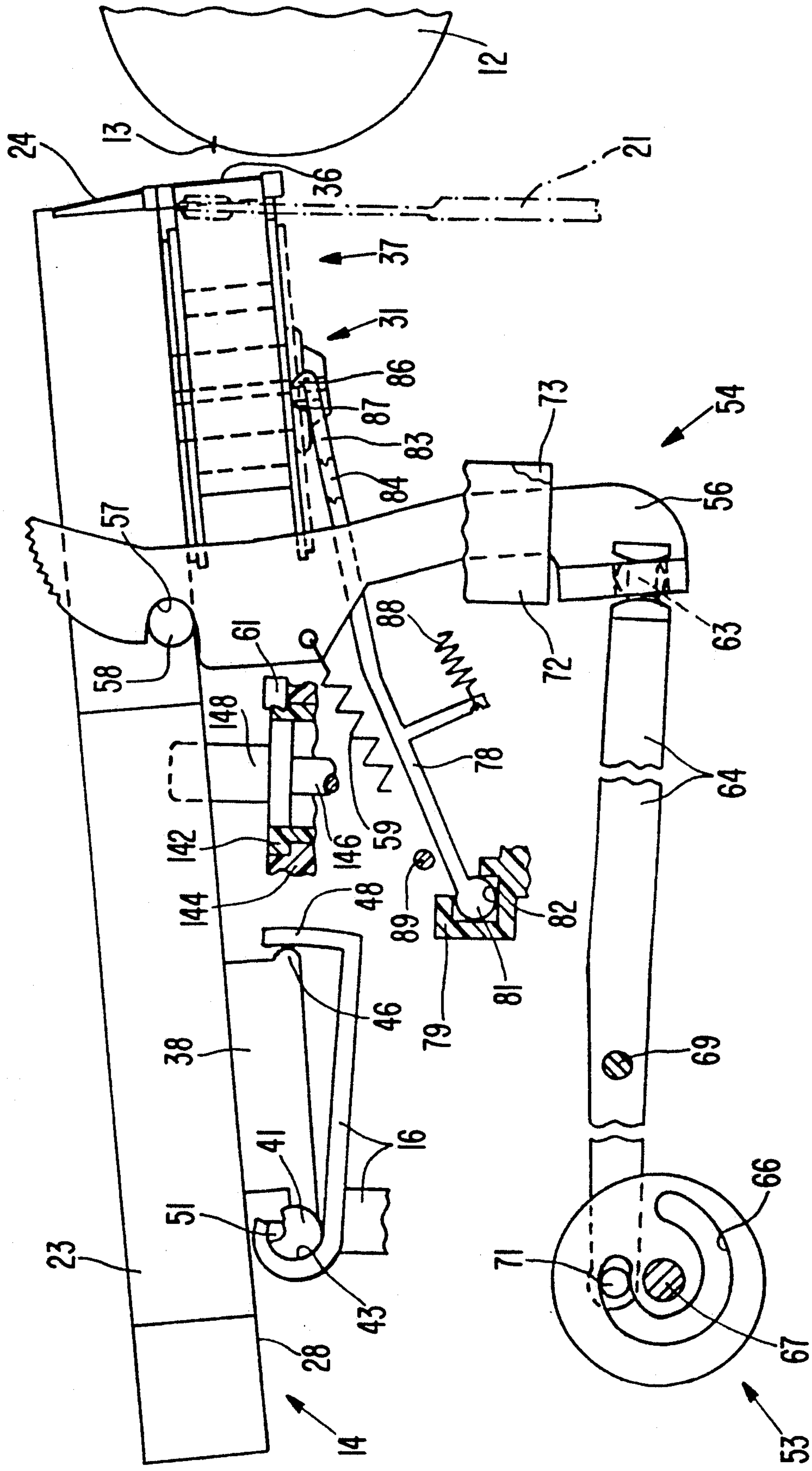
FIG. 2 is a partial longitudinal view of the machine of FIG. 1 in an operating position.
Figure 3:
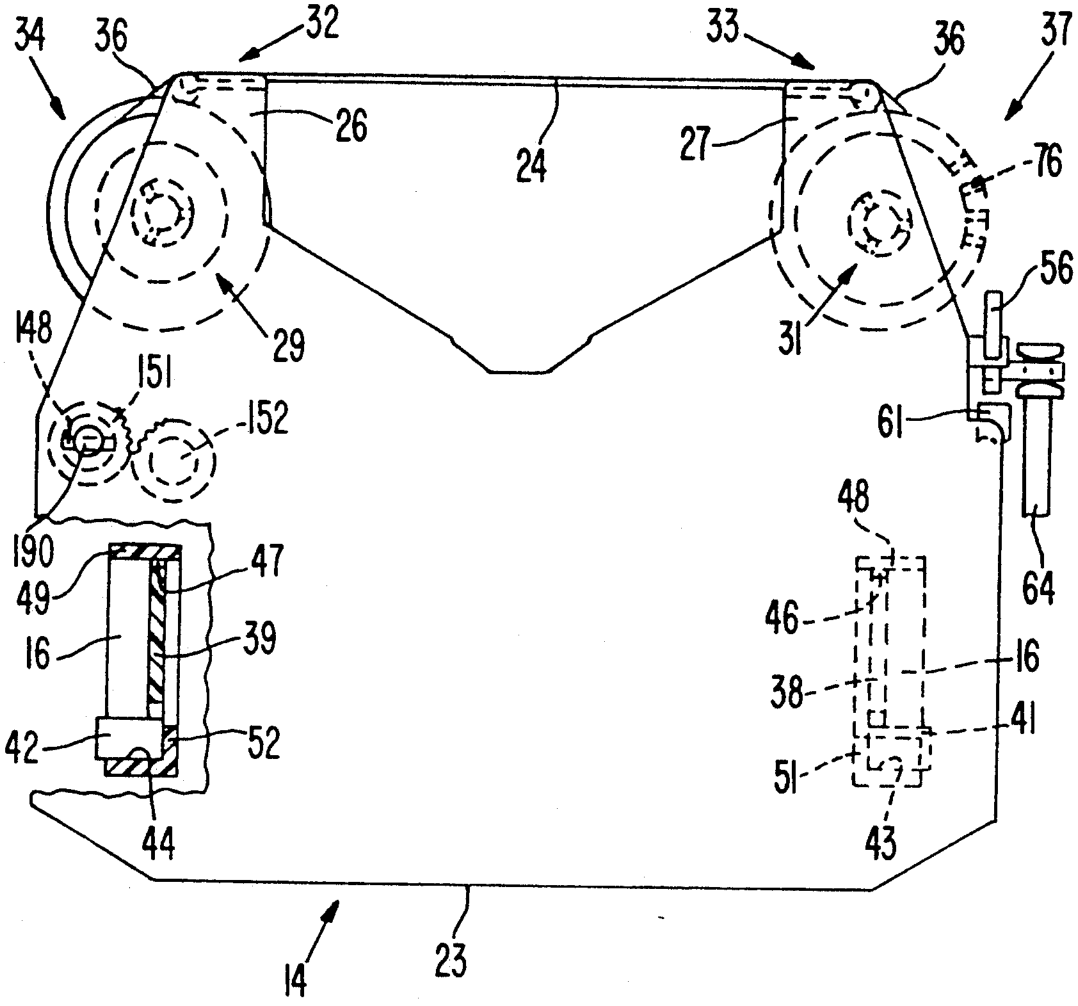
FIG. 3 is a partial plan view of the machine of FIG. 1 on a different scale.
Figure 4:
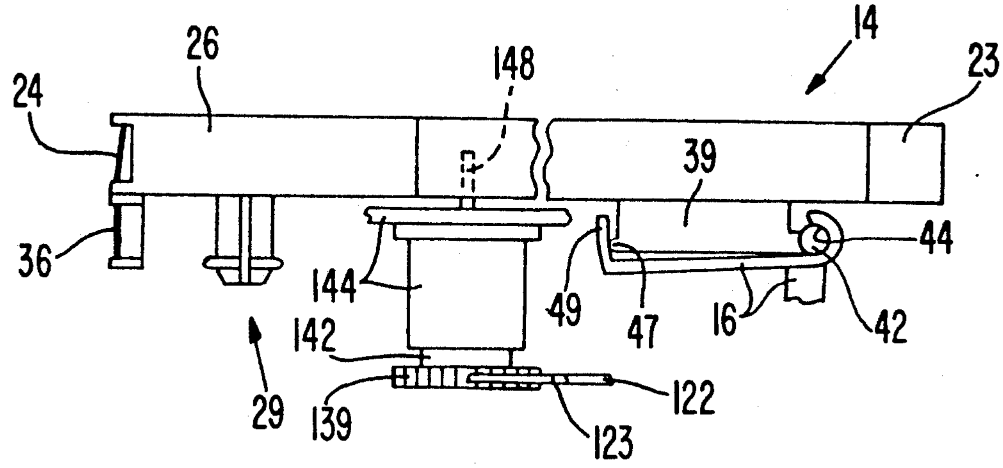
FIG. 4 is a partial side view of the machine shown in FIG. 3.

Referring to FIGS. 1, 2, 3 and 4, the ribbon feed movement arrangement is generally indicated by reference numeral 11 and is applied to a typewriter having a conventional platen roller 12 which defines a typing point 13, and a cassette 14 which is removably fixed on a support 16 of a carriage 17. The carriage 17 is movable and slidable along two guides 18 and 19 backwards and forwards in parallel relationship to the platen roller 12 and is capable of carrying in known manner support 16, a character-carrying disc 21 and a stider hammer 22. The carriage 17, the character-carrying disc 21 and the striker hammer 22 are known and are only shown in diagrammatic form and are not described in detail in order not to complicate the description and the drawings.

The cassette 14 comprises a container 23 capable of accommodating a typing ribbon 24 and having two arms 26 and 27 which project to position an external portion of the typing ribbon 24 in front of the typing point 13. The container 23 has a bottom 28 from which two latching means 29 and 31 and two guide elements 32 and 33 project outwardly from the container 23. The latching means 29 and 31 are fixed with respect to the bottom 28 and the first is capable of rotatably supporting a supply spool 34 on which a correction ribbon 36 is wound, while the second is capable of rotatably supporting a take-up spool 37 on which the correction ribbon 36 is wound after having been used. The two guide elements 32 and 33 are fixed with respect to the bottom 28; they are parallel to the two latching means 29 and 31 and they are positioned at the ends of the arms 26 and 27 to guide a portion of the correction ribbon 36 beneath the typing ribbon 24 and the platen roller 12.

The container 23 comprises two guide elements 38 and 39 which project from the bottom 28 and which are each provided, at one end, with a pin 41, 42 capable of being accomodated in a semicylindrical seat 43, 44 in the support 16, while at another end, they each have a shoulder 46, 47 co-operable with a curved opposite wall 48, 49 of the support 16, having a centre of curvature which coincides with the axis of the semicylindrical seat 43, 44. The axis of the semicylindrical seats 43 and 44 are coincident and parallel to the platen roller 12 and define an axis for oscillatory movement of the cassette 14. The semicylindrical seats 43 and 44 with the co-operating walls 48 and 49 define the longitudinal position of the container 43 with respect to the platen roller 12. In addition each semicylindrical seat 43, 44 is closed by a side wall 51, 52 in such a way as also to define the transverse position of the container 23.

A lifting device 53 positions the container 23 by means of a connecting element 54 of the machine and a pin 58 which is fixed with respect to and projecting from the container 23, between a first position in which the typing ribbon 24 is positioned in front of the typing point 13 and a second position in which the correction ribbon 36 is positioned in front of the typing point 13, in each correction cycle. The connecting element 54 comprises a connecting lever 56 having a semicylindrical seat 57 and a spring 59 which holds the lever 56 with its seat 57 in engagement with the pin 58 when the cassette 14 is mounted on the support 16 or in a position of being arrested against a shoulder 61 on the carriage 17 when the cassette 14 is removed from the machine. The connecting lever 56 is pivoted by means of a seat 62 on a ball joint 63 on a control lever 64 of the lifting device 53.

Figures 5, 6, 9:
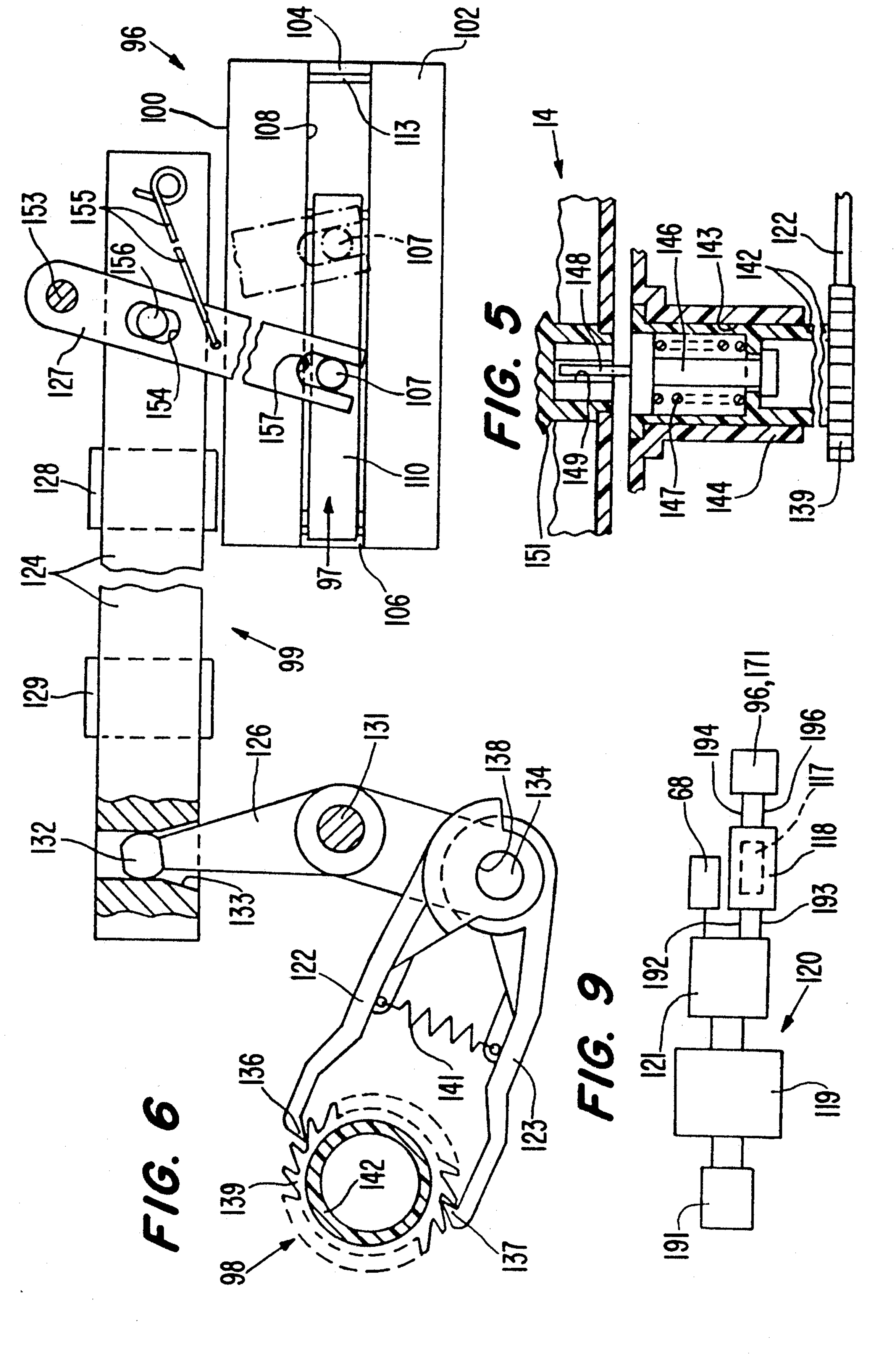
FIG. 5 is a patial view in section of some details for FIG. 4 on a different scale.
FIG. 6 is a partial view of the details from FIG. 4 on a different scale.
FIG. 9 shows a block logic diagram of a control and governing unit of the machine shown in FIG. 1.

The lifting device 53 comprises a slot-type cam 66 which is fixed on a drive shaft 67 which is in turn rotated in both directions by motor 68 (see FIG. 9). The control lever 64 (see FIGS. 1, 2, 3 and 4) is pivoted on a shaft 69 on the carriage 17 and at one end comprises a cam follower pin 71 which is always positively engaged with and actuated by the cam 66 while at another end it has the ball joint 63. The connecting lever 56 is rotatable in a plane perpendicular to the platen roller 12 for engaging its seat 57 with and disengaging it from the pin 58 on the container 23 during fitting and removal of the cassette 14, and it is guided vertically by two guides 72 and 73.

In each correction cycle the correction ribbon 36 is positioned in front of the typing point 13 and is advanced in a unidirectional motion by a feed mechanism 74. The feed mechanism 74 comprises a toothed ring portion 76 which is fixed with respect to a lower flange 77 of the take-up spool 37 and a ratchet assembly 78 pivoted on a support 79 on the carriage 17. The ratchet assembly 78 is pivoted on the carriage 17 in parallel relationship with the axis on the seats 43 and 44 by means of a semicylindrical end 81 accommodated in a seat 82 of the support 79 and comprises two spaced-apart arms 83 and 84 having respective hook portions 86, 87 co-operable with two mutually diametrally opposite teeth of the toothed ring portion 76. A spring 88 acts on the ratchet assembly 78 in such a way that it is always rotated upwardly so that the hook portions 86 and 87 are always engaged with the teeth of the toothed ring portion 76 if the cassette 14 is fitted on the support 16. In the event that the cassette 14 is removed from the machine, the ratchet assembly 78 is instead arrested against a fixed stop 89 on the carriage 17. The two hook portions 86 and 87 are positioned in mutually opposed directions in such a way that, during a first phase in which the container 23 moves from the first position to the second position, the first hook portion 86 pulls a first tooth while the second hook portion 87 passes over a second tooth, while in the second phase in which the container 23 moves from the second position to the first position, the first hook portion 86 passes over a tooth adjacent to the first tooth while the second hook portion 87 pushes the second tooth, causing the take-up spool 37 always to be rotated in the same direction to produce a unidirectional feed movement of the correction ribbon 36.

The ribbon feed arrangement 11 (FIGS. 1, 4, 5, 6, 7 and 9) comprises a linear motor 96 having an output member in the form of a slide 97 which is movable with a rectilinear alternating movement, a drive element for the feed movement of the ribbon as indicated at 98 and a connecting mechanism 99 interposed between the slide 97 and the ribbon feed element 98 for converting the rectilinear alternating movement of the slide 97 into a unidirectional movement for feeding the ribbon, namely in this preferred example the typing ribbon 24 which is accommodated in the cassette 14.

The linear motor 96 is of the type comprising a ferromagnetic circuit 100, a permanent magnet 101 and an excitation winding 103. The magnet 101 is of radial type and is in the form of a sleeve with an outer cylindrical surface and an inner cylindrical surface. The magnet 101 is polarised radially in such a way as to define a first polarity on its outer cylindrical surface and a polarity opposite to the first at its inner cylindrical surface. The ferromagnetic circuit 100 comprises a cylindrical casing 102 with a groove 108, a core 109 of cylindrical shape, and two circular plates 104 and 106 which are fixed to the ends of the casing 102 and the core 109 in such a way as to arrange the core 109 coaxially with respect to the casing 102. The core 109 and the casing 102 are of an axial dimension which is slightly greater than double the axial dimension of the permanent magnet 101 and the magnet 101 is fixed on the core 109 in such a way as to be surrounded by the casing 102 to define therewith an air gap through which passes the radial magnetic flux generated by the permanent magnet 101. The permanent magnet 101 is mounted on the core 109 in an axially centered position between the two plates 104 and 106 and is held in that centered position by means of two cylindrical spacers 111 and 112 of non-magnetic material having outside cylindrical surfaces aligned with the outside cylindrical surface of the magnet 101.

The winding or coil 103 is coaxial with respect to the magnet 101, is accommodated in the air gap, and is supported by the slide 97. The coil carrying slide 97 is capable of bidirectional movement in coaxial relationship with respect to the permanent magnet 101 in response to bidirectional excitation currents in the winding 103. The slide 97 also has an engagement element 107 which projects from the longitudinal groove 108 of the casing 102 for transmitting the bidirectional movement of the slide 97 to the mechanism 99. Finally, fixed on the inside walls of the plates 104 and 106 are two damping elements 113 and 114 for damping noise and cushioning the end of the travel of the slide 97 in its bidirectional movement. In particular the slide 97 is of non-magnetic material and comprises a flanged sleeve 116 on which the coil or winding 103 is wound and which is guided slidably on the magnet 101 and the spacers 111 and 112. Finally the engagement element 107 comprises a pin carried by a plate 110 which in turn is slidably accommodated in the groove 108 and which is engaged in two projections of the flanges of the sleeve 116, which project outwardly from the groove 108. The winding 103 extends axially over a length equal to about 50% more than the length of the magnet 101 and, even in the two end-of-travel positions, the major part of its volume has the major part of the magnetic flux generated by the magnet 101 passing therethrough. The level of efficiency of the linear motor 96 is therefore very high.

The bidirectional excitation currents come from a bridge-type transformer 117 of an actuating circuit 118 which is controlled by a microprocessor 120 of the machine comprising a central unit 119 and an input-output unit 121.

The connecting mechanism 99 comprises two ratchet assemblies 122 and 123 and a slider 124 which is capable of rectilinear movement and which is connected by means of a first lever 126 to the two ratchet assemblies 122 and 123 and by means of a second lever 127 to the engagement element 107 of the coil-carrying slide 97. The slider 124 is housed and guided in respect of its movement by two guides 128 and 129 on the carriage 17. The first lever 126 is rotatable on a pin 131 on the carriage 17 and is connected at one end by means of a connection comprising a pin 132 and a slot 133 to the slider 124. Another end of the lever 126 carries a shaft 138 on which the two ratchet assemblies 122 and 123 are rotatable.

Each of the two ratchet assemblies 122 and 123 is provided with a hook portion 136 and 137 at one end while at its other end each ratchet assembly has a seat 138 by means of which it is rotatably carried on the shaft 134. The two hook portions 136 and 137 are capable of co-operating with a gear or wheel 139 with a sawtooth configuration, which is in turn connected to the ribbon feed drive element 98. For that purpose a resilient element or spring 141 holds the two hook portions 136 and 137 constantly in engagement with first and second teeth on the sawtooth wheel 139, which are disposed on mutually diametrally opposite sides thereof. The two hook portions 136 and 137 are positioned with the respective active parts thereof one in the opposite direction to the other in such a way that during activation in one direction of the coil-carrying slide 97, for example from left to right, the first hook portion 136 displaces the first tooth of the wheel 139 and rotates the wheel 139 by an angular step while at the same time the second hook portion 137 passes over the second tooth. During the rectilinear movement in the opposite direction of the coil-carrying slide 97, the second hook portion 137 pulls the second tooth and rotates the sawtooth wheel 139 through another angular step in the same direction as that which was produced previously, while the first hook portion 136 passes over the tooth adjacent to the first tooth. That causes unidirectional feed movement of the typing ribbon 24 during the alternating rectilinear movement of the coil-carrying slide 97, as will be described hereinafter.

The ribbon feed drive element 98 is connected to the sawtooth wheel 139 by means of a tube portion 142 which is fixed with respect to the wheel 139 and is rotatable in a seat 143 in a support 144 on the carriage 17. The tube portion 142 contains a plunger 146 which is movable vertically within the tubular portion 142 and is fixed with respect to the tubular portion 142 by the force of a resilient element or spring 147. At one end the plunger 146 has a blade 148 which projects from the tubular portion 142 and which is capable of engaging into a seat 149 in a feed roller 151 of the cassette 14. The feed roller 151 in turn co-operates with a pressure roller 152 for pinching the typing ribbon 24, causing it to be fed with a unidirectional movement during the rotary movement of the wheel 139 resulting from the alternating rectilinear movement of the coil-carrying slide 97. The two rollers 151 and 152 are well known and are only diagrammatically illustrated.

The second lever 127 is rotatable on a pin 153 on the carriage 17 and is connected by means of a slot 154 to a pin 156 on the movable slider 124 and is connected by means of a slot 157 to the pin which forms the engagement element 107. A bistable spring which is diagrammatically indicated at 155 and which acts on the lever 127 provides for holding the coil-carrying slide 97 in the two limit positions thereof after termination of the excitation current in the winding 103.

Figure 7:
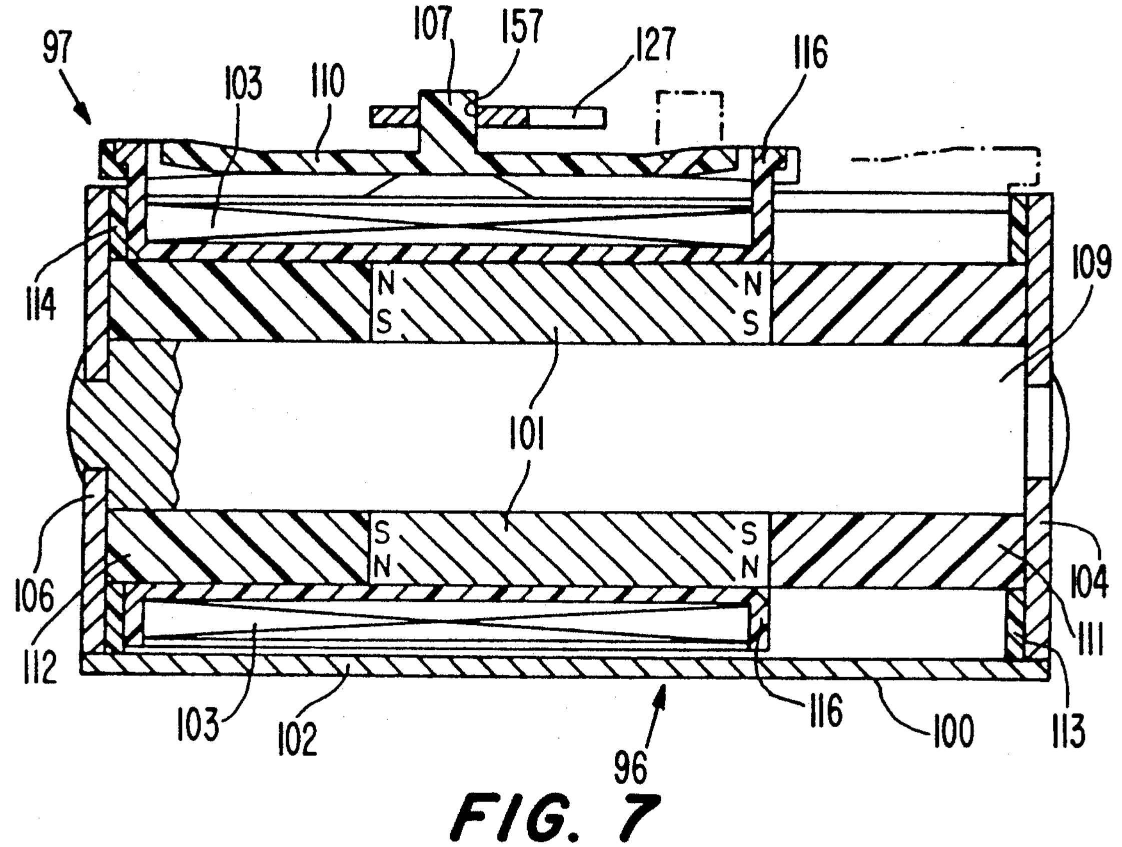
FIG. 7 is a partial view in section of some details from FIG. 6 on a different scale.
Figure 8:
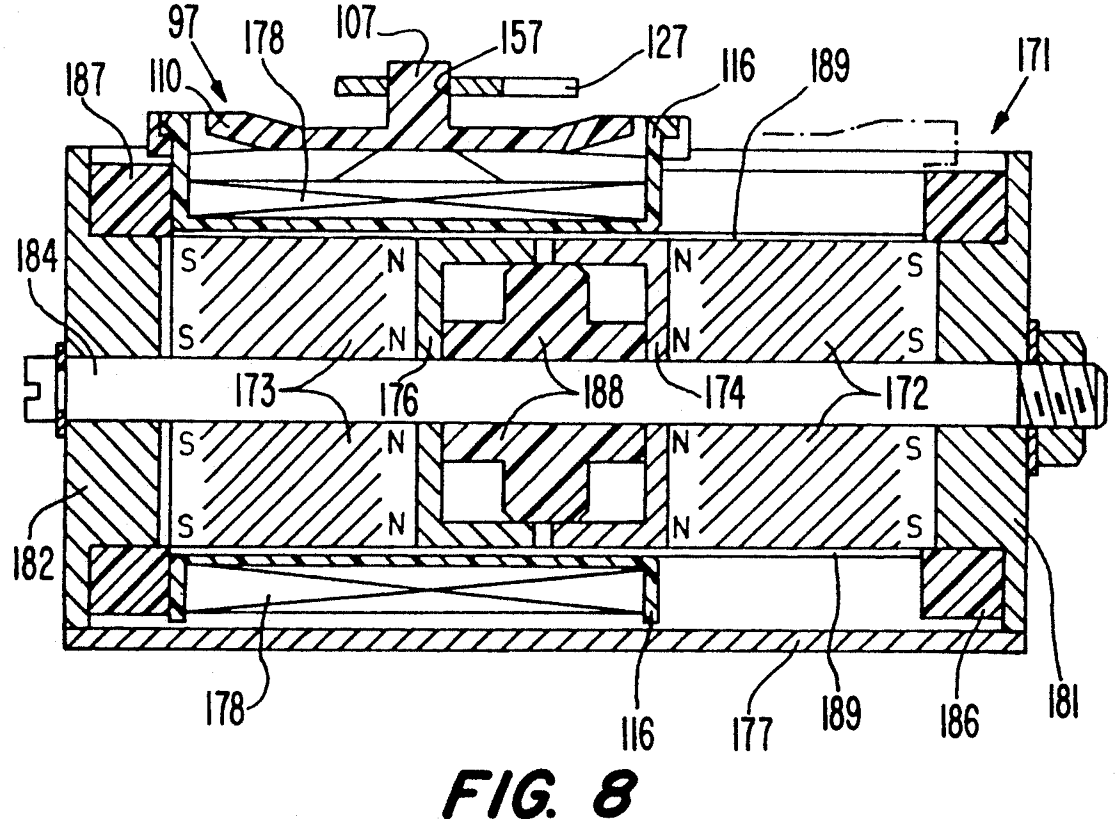
FIG. 8 is partial view is section of an alternative form of the details shown in FIG. 7.

The alternative construction shown in FIG. 8 illustrates a linear motor 171 of commercial type which differs from the linear motor 96 in FIG. 7 in that it comprises two permanent magnets 172 and 173 of cylindrical shape and with axial magnetisation, being coaxial with each other and having the two like poles facing towards each other, and having two ferromagnetic pole pieces 174 and 176 which are connected to the two like poles. A ferromagnetic casing 177 of cylindrical shape is closed by means of two ferromagnetic plates 181 and 182 at the other two like poles of the permanent magnets 172 and 173 and defines a radial air gap with the pole pieces 174 and 176 and the two permanent magnets 172 and 173. The linear motor 171 comprises a winding 178 which is accommodated in the space between the magnets 172 and 173 and the casing 177 and which is supported by a coil-carrying slide 97 substantially identical to the coil-carrying slide 97 of the linear motor shown in FIG. 7, being identified by the same reference numerals. The slide 97 is capable of bidirectional movement in coaxial relationship with the permanent magnets 172 and 173 in response to bidirectional excitation currents in the winding 178. The ferromagnetic casing 177 comprises a longitudinal groove 108 capable of permitting the movement of the slide 97 and the passage of the engagement element or pin 107.

The two permanent magnets 172 and 173 are mounted at the ends of a pin or rod 184 of non-magnetic material, adjacent to the two plates 181 and 182. Two damping elements 186 and 187 of synthetic material are positioned against the two end plates 181 and 182 to dampen the end of the travel of the slide 97 in the bidirectional motion thereof. The pin 184 is fixed at the ends to the two plates 181 and 182. The two pole pieces 174 and 176 are coaxial with respect to the two permanent magnets 172 and 173 and a spacer portion 188 of non-magnetic material which is positioned on the pin 184 holds the two pole pieces 174 and 176 in mutually facing relationship and at a fixed distance from each other. The permanent magnets 172 and 173 and the pole pieces 174 and 176 are covered by a slide-guiding sheath 189 of synthetic material which slidably supports the sleeve 116 of the slide 97 and facilitates the alternating movement thereof. The two linear motors 96 and 171 operate in substantially the same fashion as each other. The motor 171 is slightly more expensive than the motor 96 but it can be more easily polarised. However the motor 171 has a level of efficiency which is slightly less than the motor 96 by virtue of the smaller percentage of magnetic flux generated by the magnets 172 and 173 which can pass through the winding 178.

The mode of operation of the feed arrangement 11 as described above is as follows.

During the operation of fitting the cassette 14 onto the support 16, the pins 41 and 42 are engaged by being accommodated in the respective semicylindrical seats 43 and 44, the shoulders 46 and 47 come into engagement with the corresponding co-operating walls 48 and 49, and the pin 58 is positioned with the seat 57 in the connecting lever 56, due to the force of the spring 59. The blade 148 on the drive element 98 can be in a position corresponding to the seat 149, and is thus positioned by being accommodated within the seat 149, or it may not be in a position corresponding thereto. In the latter case the blade 148 is moved downwardly with the plunger 146 against the force of the spring 147. As soon as the cassette 14 is fixed removably on the support 16, a peg 190 is operated manually, causing rotary movement of the feed rollers 151 and 152, or the system is operated by way of a keyboard 191 to effect a feed cycle for the typing ribbon 24, as described hereinafter. During that operation or by rotation of the rollers 151 and 152 or by rotation of the blade 148, the seat 149 is disposed in a position corresponding to the blade 148 and the spring 147 displaces the plunger 146 with the blade 148 into the seat 149 and the external portion of the ribbon 24 is tensioned.

In each typing cycle or in each cycle of feed movement of the ribbon 24, the central unit 119, after printing of the character selected by means of the keyboard 191, passes a control pulse to the input-output unit 121. The unit 121 switches the signal received from the central unit 119 alternatively on the lines 192 and 193 for activating two opposite parts of the bridge-type transformer 117 of the actuating circuit 118, in per se known manner. The transformer 117 is connected by means of lines 194 and 196 to the linear motor 96 or 171 and passes the current pulse thereto. The coil-carrying slide 97 is moved with an alternating rectilinear movement selectively in one direction or the other in accordance with the direction of the current pulse on the lines 194 and 196.

If the linear motor 96, 171 has for example the slide 97 positioned against the left-hand end wall 106, 108 then, as soon as it receives the excitation current from the line 194, the slide 97 is displaced towards the right-hand end wall 104, 181, passing beyond the dead-centre point of the spring 155. The pin 107 on the slide 97 causes rotary movement in the anticlockwise direction of the lever 127 which causes the slider 124 to slide towards the right. The slider 124 causes rotary movement in a clockwise direction of the lever 126 with the two ratchet assemblies 122 and 123. The hook portion 136 of the ratchet assembly 122 engages the respective tooth, causing the sawtooth wheel 139 to rotate in the anticlockwise direction, while the hook portion 137 of the ratchet assembly 123 passes over the respective tooth. The wheel 139 rotates with the tubular portion 142, the plunger 146 and with the blade 148 rotating the feed rollers 151 and 152, producing a feed movement of the typing ribbon 24 by an elementary feed step. The spring 155 holds the slide 97 in the right-hand limit position.

The linear motor 96, 171 now has the slide 97 positioned against the right-hand end wall 104, 181 as shown in dash-dotted lines in the drawings (FIGS. 7, 8). The central unit 119 passes another signal, as described above, and the linear motor 96, 171 receives the excitation current from the line 196. The slide 97 is moved towards the left-hand end wall 106, 102, moving beyond the dead-centre point of the spring 155, and the pin 107 causes rotation in the clockwise direction of the lever 127 which causes the slider 124 to slide towards the left. The slider 124 causes rotary movement in the anticlockwise direction of the lever 126 with the two ratchet assemblies 122 and 123. The hook portion 136 of the ratchet assembly 122 passes over the respective tooth while the hook portion 137 of the ratchet assembly 123 pulls the respective teeth, still causing the wheel 139 to rotate in the anti-clockwise direction. The wheel 139 rotates with the tubular portion 142, and the plunger 146, with the blade 148, and rotates the feed rollers 151 and 152, causing unidirectional feed movement of the typing ribbon 24 through a second elementary feed step. The spring 155 now holds the slide 97 in the left-hand limit position.

For a typing cycle or for repeated typing cycles, the slide 97 is capable of bidirectional movements which are coaxial with respect to the permanent magnet 101 or permanent magnets 172 and 173 in response to bidirectional excitation currents in the winding 103, 178, which are controlled and monitored by the central unit 119. The arrangement is fast and has a high level of efficiency, without any need for the provision of a return spring, being capable of providing for the elementary feed movements with very elevated repetition cycles.

If the keyboard 191 activates the central unit 119 for a correction cycle, the central unit 119 passes a control signal to the input-output unit 121 which controls and activates the motor 68. The motor 68, by way of the drive shaft 67, rotates the cam 66 which by way of the control lever 64 lifts the connecting lever 56, moving the container 23 from the first position in which the typing ribbon 24 is in front of the typing point 13 to the second position in which the correction ribbon 36 is in front of the typing point 13. During that movement the ratchet assembly 78 advances the correction ribbon 36 by a predetermined amount, as described hereinbefore. At the end of the correction operation the motor 68 which is controlled by the central unit 119 rotates in the opposite direction, moving the container 23 from the second position to the first position. During that movement the ratchet assembly 78 advances the correction ribbon 36, thus completing the feed cycle. During those movements of the cassette 14 the blade 148 always remains in engagement in the seat 149, even if only partially, whereby the feed arrangement 11 is always ready to effect fresh typing cycles.

It will be appreciated that various modifications and improvements may be made in the feed arrangement 11, the linear motors 96 and 171, the feed element 98 and the connecting mechanism 99 as described hereinbefore, both in regard to the form and the arrangement of the various parts, without departing from the scope of the present invention.

In particular if the correction ribbon 36 is accommodated in a correction cartridge which is positioned below the cassette 14, a second feed arrangement 11 may be mounted on the carriage 17 to replace the feed mechanism 74 to provide for unidirectional feed movement of the correction ribbon 36.

The feed arrangement 11 may not be limited solely to use thereof for feeding the typing ribbon 24 and the correction ribbon 36, but it may also be used for effecting other functions and services in the typewriter.

Alternatively to the foregoing description, the linear motor may be of the type in which the excitation winding is fixed and the permanent magnet is movable and displaces the output member of the linear motor itself, directly or by means of return transmission members. It will also be clear that, instead of providing for a rectilinear movement of the output member, the linear motor may produce an alternating movement of rotary type of its output member.

What we claim is:

1. A feed arrangement for a ribbon of a typing machine, comprising a reciprocable member actuatable for an alternating movement, a rotatable drive element for the feed movement of the ribbon and a connecting mechanism interposed between said reciprocable member and said drive element for converting alternating movement of said reciprocable member into unidirectional movement of said drive element for producing a unidirectional feed movement of said ribbon and a linear motor for actuating said reciprocable member; said linear motor comprising:

a central ferromagnetic core having two extremities, a central portion and a central axis;

a casing surrounding said central core coaxial to said central axis and including a groove parallel to said central axis, two extremities and an inner central portion;

two flanges of ferromagnetic material fixed at the extremities of said central core and said casing;

permanent magnet means mounted on said central core for defining a gap close to said casing and a radial magnetic field in said gap between the central portions of said core and said casing;

a coil-carrying slide surrounding said permanent magnet means and capable of bidirectional movement in said gap between said two flanges;

an excitation winding supported by said coil-carrying slide and feedable by an excitation current for being moved together with said coil carrying slide in a first direction in response to a first sense of the excitation current and in a second direction opposite to said first direction in response to a second sense of the excitation current opposite to said first sense; and an engagement element mounted on said coil-carrying slide and slidably accommodated in said groove for engaging said reciprocable member and transmitting to said reciprocable member the motion of said excitation winding and the coil-carrying slide.

2. The arrangement of claim 1, further comprising a bistable spring for retaining said reciprocable member in one of two end-of-movement positions of said coil-carrying slide.

3. The arrangement of claim 1, in which said drive element comprises a gear and a feed roller for the typing ribbon, and in which said connecting mechanism comprises two ratchet assemblies for engaging two oppositely disposed teeth of said gear operatively connected to said feed roller, a lever connected to said two ratchet assemblies and a slider connected to said reciprocable member, which is engaged with said element of said coil-carrying slide.

4. In a typing machine including a reciprocable member, a linear motor comprising:

a central ferromagnetic core having two extremities, a central portion and a central axis;

a casing surrounding said central core coaxial to said central axis and including a groove parallel to said central axis, two extremities and an inner central portion;

two flanges of ferromagnetic material fixed at the extremities of said central core and said casing;

a permanent magnet of radial type mounted on the central portion of said central core between the central portion of said central core and the inner central portion of said casing for defining a gap close to said casing, wherein said magnet is polarized radially for generating a radial magnetic field in said gap;

a coil-carrying slide surrounding said permanent magnet and capable of bidirectional movement in said gap between said two flanges;

an excitation winding supported by said coil-carrying slide and feedable by an excitation current for being moved together with said coil carrying slide in a first direction in response to a first sense of the excitation current and in a second direction opposite to said first direction in response to a second sense of the excitation current opposite to said first sense; and an engagement element mounted on said coil-carrying slide and slidably accommodated in said groove for engaging said reciprocable member and transmitting to said reciprocable member the motion of said excitation winding and the coil-carrying slide.

5. The apparatus of claim 4, further comprising two spacers of non-magnetic material for holding said permanent magnet in the intermediate position between said two flanges.

6. The apparatus of claim 4, further comprising means for damping noise and cushioning the end of the movement of said coil-carrying slide between said two flanges, said means for damping noise and cushioning including two damping elements of synthetic material positioned against said two flanges.

7. The apparatus of claim 4, in which said coil-carrying slide is of non-magnetic material and comprises a sleeve on which said excitation winding is wound and on which said engagement element is fixed.

8. The apparatus of claim 4, in which said casing and said central core are substantially cylindrical and in which said permanent magnet is in the form of a sleeve having the inner surface fixed to said core.

9. A typing machine according to claim 6, further comprising a bistable spring for retaining said reciprocable member against one of the two damping elements in the absence of excitation current in said excitation winding.

10. A typing machine according to claim 4, wherein said reciprocable member is used in a feed arrangement for a typing ribbon, and further comprising a rotatable drive element for the feed movement of the typing ribbon and a connecting mechanism engaged with said reciprocal member for converting the alternating movement of said coil-carrying slide into unidirectional rotational movement of said drive element.

11. The apparatus of claim 10, in which said drive element comprises a gear and a feed roller for the typing ribbon, and in which said connecting mechanism comprises two ratchet assemblies for engaging two oppositely disposed teeth of said gear operatively connected to said feed roller, a lever connected to said two ratchet assemblies and a slider connected to said reciprocable member, which is engaged with said engagement element of said coil-carrying slide.

12. A typing machine according to claim 4, further comprising an actuating circuit including a bridge-type transformer for generating said excitation current and a microprocessor for controlling said bridge-type transformer and defining said first sense of the excitation current and said second sense of the excitation current.

* * * * *